(12) United States Patent
Moradians et al.

(10) Patent No.: US 8,337,127 B2
(45) Date of Patent: Dec. 25, 2012

(54) LATCH ARRANGEMENT FOR CARGO RESTRAINT

(75) Inventors: Edward Moradians, Woodland Hills, CA (US); Kon Shim, La Palma, CA (US)

(73) Assignee: Ancra International, LLC, Azusa, CA (US)

( * ) Notice: Subject to any disclaimer, the term of this patent is extended or adjusted under 35 U.S.C. 154(b) by 65 days.

(21) Appl. No.: 13/066,777

(22) Filed: Apr. 26, 2011

(65) Prior Publication Data

US 2012/0275877 A1 Nov. 1, 2012

(51) Int. Cl.
*B60P 7/08* (2006.01)
(52) U.S. Cl. ......... 410/104; 410/101; 410/102; 410/105
(58) Field of Classification Search .............. 410/101, 410/102, 111, 104, 105, 69, 77–79, 92, 83; 248/503, 500, 503.1; *B60P 7/08*
See application file for complete search history.

(56) References Cited

U.S. PATENT DOCUMENTS

| | | | |
|---|---|---|---|
| 3,693,919 A | 9/1972 | Alberti et al. | 248/119 R |
| 3,693,920 A | 9/1972 | Trautman | 248/119 R |
| 3,698,679 A | 10/1972 | Lang et al. | 248/361 R |
| 3,774,551 A | 11/1973 | Sweger | 105/366 |
| 3,906,870 A | 9/1975 | Alberti | 105/464 |
| 3,927,622 A | 12/1975 | Voigt | 105/463 |
| 4,005,788 A | 2/1977 | Ratliff | 214/77 |
| 4,077,590 A | 3/1978 | Shorey | 244/118 R |
| 4,089,275 A | 5/1978 | Pelletier | 105/465 |
| 4,095,704 A | 6/1978 | Ratliff | 214/77 |
| 4,121,789 A | 10/1978 | Lent et al. | 244/118 R |
| 4,230,432 A * | 10/1980 | Howell | 410/102 |
| 4,331,412 A | 5/1982 | Graf | 410/69 |
| 4,401,286 A | 8/1983 | Naffa | 244/137 R |
| 4,415,298 A | 11/1983 | Voigt | 410/69 |
| 4,430,032 A | 2/1984 | Morgan | 410/68 |
| 4,498,823 A | 2/1985 | Trautman | 410/84 |
| 4,530,483 A | 7/1985 | Nordstrom | 248/500 |
| 4,583,896 A | 4/1986 | Vogg et al. | 410/69 |
| 4,645,392 A * | 2/1987 | Takaguchi | 410/80 |
| 4,696,609 A | 9/1987 | Cole | 410/69 |
| 4,900,204 A | 2/1990 | Summers | 410/97 |
| 5,011,348 A | 4/1991 | Jensen et al. | 410/79 |
| 5,035,184 A | 7/1991 | Bott | 104/121 |
| 5,085,326 A | 2/1992 | Russell et al. | 211/4 |
| 5,090,638 A | 2/1992 | Eilenstein-Wigmanns | 244/118.1 |
| 5,098,038 A | 3/1992 | Hruska et al. | 244/137.1 |
| 5,130,899 A | 7/1992 | Larkin et al. | 362/32 |
| 5,167,479 A | 12/1992 | Bott | 410/121 |
| 5,169,091 A | 12/1992 | Beroth | 244/122 |
| 5,178,346 A | 1/1993 | Beroth | 244/122 R |
| 5,234,297 A | 8/1993 | Wieck et al. | 410/77 |
| 5,265,991 A | 11/1993 | Herrick et al. | 410/69 |

(Continued)

*Primary Examiner* — Glenn Dayoan
*Assistant Examiner* — Sunsurraye Westbrook
(74) *Attorney, Agent, or Firm* — Brinks Hofer Gilson & Lione

(57) ABSTRACT

An improved cargo restraint for installation on a preselected track mounted in or on the surface of a vehicle carrying the cargo and the restraint is mounted on a bracket which abuts the cargo to restrain the movement of the cargo and the restraint is slidingly movable on the track and has a locking position on the track wherein the bracket restrains the cargo and the restraint has no relative movement with respect to the track or the bracket or the vehicle so that there is no rattling of the restraint when in the locked position.

18 Claims, 6 Drawing Sheets

U.S. PATENT DOCUMENTS

| | | | |
|---|---|---|---|
| 5,316,242 A | 5/1994 | Eilenstein-Wiegmann | 244/137 |
| 5,346,161 A | 9/1994 | Eilenstein-Wiegmann | 244/137.1 |
| 5,370,342 A | 12/1994 | Nordstrom | 244/118.1 |
| 5,397,078 A | 3/1995 | Eilenstein-Wiegmann | 244/118.1 |
| 5,486,077 A | 1/1996 | Nutting | 410/69 |
| 5,489,172 A | 2/1996 | Michler | 410/105 |
| 5,564,654 A | 10/1996 | Nordstrom | 244/118.1 |
| 5,573,359 A | 11/1996 | Moradians | 410/69 |
| 5,609,452 A | 3/1997 | Looker et al. | 410/105 |
| 5,618,139 A | 4/1997 | Graf et al. | 410/69 |
| 5,655,863 A | 8/1997 | Mundt | 410/94 |
| D388,393 S | 12/1997 | Moradians | D12/400 |
| 5,692,862 A | 12/1997 | Hilde | 410/69 |
| 5,816,758 A | 10/1998 | Huber | 410/77 |
| 5,860,777 A | 1/1999 | Walsh et al. | 410/100 |
| 5,888,040 A | 3/1999 | Walsh et al. | 410/100 |
| 5,957,406 A | 9/1999 | Nelson | 244/118.1 |
| 6,007,282 A | 12/1999 | Mundt | 410/94 |
| 6,015,250 A | 1/2000 | Walsh | 410/100 |
| 6,030,159 A * | 2/2000 | Herrick et al. | 410/102 |
| 6,039,519 A | 3/2000 | Jones et al. | 410/69 |
| 6,193,453 B1 | 2/2001 | Kernkamp | 410/79 |
| 6,213,696 B1 | 4/2001 | Austin | 410/106 |
| 6,238,154 B1 | 5/2001 | DaPrato | 410/151 |
| 6,270,300 B1 | 8/2001 | Huber | 410/69 |
| 6,318,938 B1 | 11/2001 | Araujo | 410/79 |
| D458,210 S | 6/2002 | Kanczuzewski et al. | D12/426 |
| 6,413,029 B1 | 7/2002 | Kernkamp | 410/79 |
| 6,425,717 B1 | 7/2002 | Saggio et al. | 410/79 |
| 6,450,744 B1 | 9/2002 | Gilhuys et al. | 410/69 |
| 6,485,238 B2 | 11/2002 | Segura | 410/69 |
| 6,485,239 B2 | 11/2002 | Afful | 410/80 |
| 6,533,513 B2 | 3/2003 | Kanczuzewski et al. | 410/152 |
| D485,227 S | 1/2004 | Graham | D12/426 |
| 6,695,555 B2 | 2/2004 | Eilenstein et al. | 410/92 |
| 6,702,532 B1 | 3/2004 | Throener | 410/94 |
| 6,789,988 B1 * | 9/2004 | Moradians | 410/105 |
| 6,896,456 B2 | 5/2005 | Huber | 410/77 |
| 6,926,481 B2 | 8/2005 | Huber | 410/80 |
| 7,118,152 B2 | 10/2006 | Cucknell et al. | 296/37.16 |
| 7,306,416 B1 | 12/2007 | Arico et al. | 410/94 |
| 7,318,695 B2 * | 1/2008 | Yu et al. | 410/105 |
| 7,429,157 B2 | 9/2008 | Schulze et al. | 410/69 |
| 7,435,043 B2 | 10/2008 | Brekken et al. | 410/69 |
| 7,452,170 B2 | 11/2008 | Girardin | 410/23 |

* cited by examiner

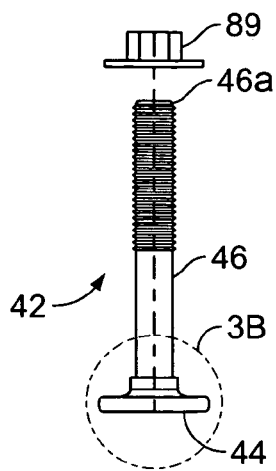
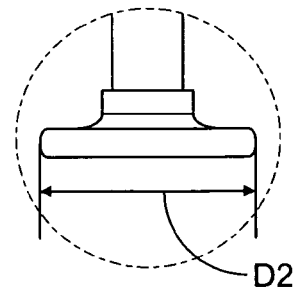
FIG. 3A                FIG. 3B
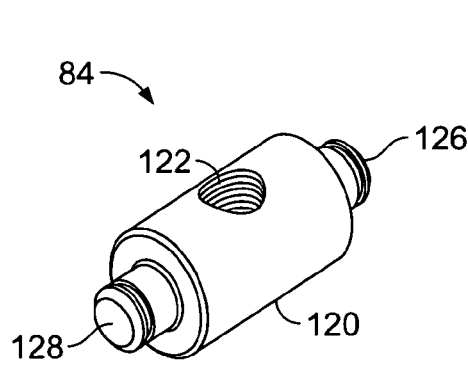
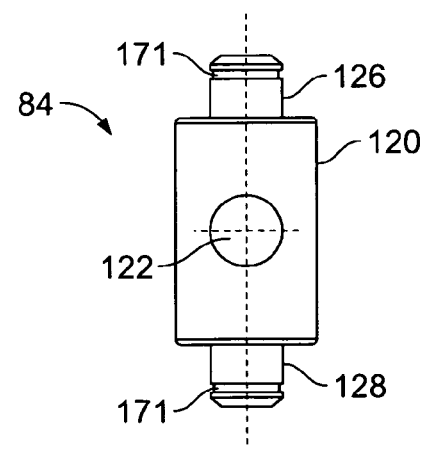
FIG. 4A                FIG. 4B

LATCH ARRANGEMENT FOR CARGO RESTRAINT

BACKGROUND OF THE INVENTION

1. Field of the Invention

This invention relates to the cargo restraint art and more particularly to a latch arrangement for restraining the horizontal and vertical movement of cargo in vehicles such as aircraft, trucks, railroad freight cars and the like.

2. Description of the Prior Art

In the above mentioned transportation of cargo by various vehicles such as cargo aircraft, vehicular trucks, railroad freight cars and the like it is often necessary to restrain the cargo from undesired movement during the transportation. In many applications, flexible cargo straps secured to the structure of the vehicle and wrapped around the cargo with the ends of the straps secured together have heretofore been utilized. Such flexible straps have not always been successful in restraining variously configured cargos against all undesired movements.

In other applications, mechanical devices have been utilized for cargo restraint in vehicles, such as cargo loads mounted on pallets. The restraints for such pallet type mounted cargo have proven to be satisfactory, but in many transportation vehicles special tracks, generally of a pre-designated configuration, are provided as mounted on or embedded in the load bearing surfaces such as the deck, side walls, bulkheads and even on the roofs of the cargo carrying vehicle and the cargo load is positioned over the tracks. Since the cargo loads may be in a regular, such as rectangular configuration as well as an irregular configuration, there have often been applications where cargo restraints are required to be in contact with the load both in an aligned array as well as a non-aligned array. In some prior restraint devices heretofore proposed for use with restraining cargo in vehicles equipped with known track configurations, the restraint devices were difficult to mount on or in connection with the track as well as remove from the track. Further, in such devices when the device was idle in the track and not in use for restraining the cargo, the devices would have some relative movement with respect to the track and/or the surface supporting the track. Such relative movement often created rattling type noises in the transportation vehicle as well as possible undue wear or breakage of the device or damage to the vehicle structure or track.

Thus, it has long been desired to provide a cargo restraint that can provide restraint for any configuration of a cargo mounted in a transportation vehicle in which standardized tracks are mounted on one or more of the cargo supporting structural surfaces of the vehicle. It has also been long desired to have such restraints that easily installed into and removable from the tracks. It is yet additionally desired that the restraints provide secure restraint of the cargo against undesired movement in any direction depending on the location of the tracks on decks, walls, bulkheads or roofs during transportation. It is even further desired that such restraints may be left in the tracks when not restraining cargo and will not rattle or have undesired relative movement to the track or cargo bearing surface so that there is no rattling of the restraints in order to minimize wear and tear as well as eliminate undesired noise.

SUMMARY OF THE INVENTION

Accordingly, it is an object of the present invention to provide an improved cargo restraint mountable in transportation vehicles.

It is another object of the present invention to proved such a cargo restraint mountable on tracks in the transportation vehicle which tracks are of a known configuration.

It is another object of the present invention to provide such a cargo restraint that is easily installed in the track and removable from the tracks and movable along the tracks to a desired location for restating the cargo.

It is another object of the present invention to provide such a restraint that may be securely held in the tracks when not restraining cargo so that there is no relative movement between the restraint and the tracks and/or the surface of the vehicle thereby eliminating rattle and undue wear or damage to the restraint and/or the vehicle.

The above and other objects of the present invention are achieved, in a preferred embodiment thereof by providing a movable cargo restraint mounted on a bracket for movement along a rail type track in which the track has a known, generally modified rectangular, tubular cross section with a channel having a plurality of evenly spaced apertures in the top portion of the track extending along the length of the track. The track per se does not form part of the present invention but because of the interrelationship of the restraint of the present invention to the track, the track is described herein in detail to illustrated the environment in which the invention is utilized and to provide a better understanding of the invention. Similarly, the bracket upon which the restraint may be mounted does not form a part of the present invention as the restraint itself may be mounted on a bracket of any desired configuration required to restrain cargo of any desired shape and arranged in any orientation in the vehicle. However, the restraint interacts with the bracket and therefore portions of a bracket are shown and described herein so that the invention maybe more completely understood.

Depending on the application, there may be a plurality of the tracks affixed in spaced apart alignment to the surface comprising the base, floor, deck, wall, bulkhead or even the roof or ceiling, or the like, of the vehicle and in any orientation with respect to the direction of gravity, and a plurality of the movable restraints are mounted on the tracks.

For purposes of the description of the present invention, the invention is described as providing the restraints movably mounted on a horizontally disposed track which track may be mounted on the surface so that the top surface of the tracks are spaced above the surface of the structure carrying the cargo or the tracks may be embedded in the structure carrying the cargo with the upper surface of the tracks in substantial planar alignment with the cargo carrying surface. However, as noted above, the restraint of the present invention is equally able to be movably mounted on vertical or other oriented tracks. In some preferred embodiments of the present invention, a single movable restraint according to the principles of the present invention is mounted in a bracket and the restraint and the bracket is movable along the track, the bracket providing the load bearing surface for contact with the cargo to provide the restraining force thereon. The restraint positions the bracket to the desired location on the tracks where the bracket may engage the cargo to provide the restraint thereof. Many configurations of brackets may be utilized in which the restraint may be mounted. In some preferred embodiments of the present invention, a pair of movable restraints according to the principles of the present invention are positioned in spaced apart, back to back relationship on a bracket which is movable along the tracks.

The tracks, on which the restraint of the present invention and the bracket on which the restraint is mounted, have a generally modified box channel cross section. The box channel has a bottom wall, a pair of opposed side walls and a top wall defining an open channel therebetween. The top wall of the track has centrally located connecting passageway of a first transverse width extending along the length of the track and communicating with the channel. A plurality of circular apertures in an evenly spaced apart array are also provided extending through the top wall of the track along the connecting passageway and the apertures have a second transverse width of the diameter thereof greater than the first transverse width of the passageway. The apertures also communicate with the channel. The apertures are circular in plan view. The top wall of the tracks has an inside surface and the inside surface of the top wall is spaced from the inside surface of the bottom wall. The top wall of the track at the connecting passageway between the apertures has a narrower transverse width than the transverse width of the top wall at the apertures so that the inside surface of the top wall at the connecting passageway between the apertures may provide a bearing surface. A plurality of mounting holes may be provided in a spaced array along the bottom wall of the track to allow a connecting member such as a screw to be inserted therethrough to secure the track on or in the surface.

The restraint according to the principals of the present invention has three basic positions when mounted on the track of a transportation vehicle. These three positions are the locked position, wherein the restraint and the bracket to which it is coupled is prevented from movement along the track, an engaged position wherein the restraint and the bracket are moveable along the track but the restraint is not fixed into a position on the track and a disengaged position wherein the restraint and the bracket to which it is attached may be readily removed from the track.

The restraint, in preferred embodiments of the present invention, is provided with a control and the control member is operatively connected to the other structural elements of the restraint and the control member is movable between the three positions of the restraint so as to manipulate the other structural members of the restraint into and out of the three positions thereof.

The control member has a handle portion which may be manually grasped to move the control member between the three positions. The control member has a first end with walls defining a tab accepting aperture extend therethrough. The control member also has a second end which is comprised of a forked portion spaced from the first end. The second end has a pair of spaced apart handle arms and each of the handle arms has an outer surface and an inner surface. Inner walls defining a aligned axle accepting apertures extend through both handle arms from the outer surface through the inner surface, the handle arms also have outer edges defining a plurality if three cam surfaces. A first of the three cam surfaces is a locking cam surface, a second of the three cam surfaces is a disengaging cam surface and the third of the three cam surfaces define an engaging cam surface.

A control pin is mounted on the outer surfaces of each of the handle arms and the control pins extend outwardly therefrom.

An axle member is positioned in the axle accepting apertures of the handle arms and the handle arms are rotatably movable on the axle member between the three positions of the restraint. The axle member has a body portion between the inner surfaces of the two handle arms and outer portions extending outwardly from the outer surface of the two handle arms to regions external the handle walls. The body portion of the axle member is provided with a radially extending threaded aperture extending therethrough.

A tension stud is provided and the tension stud has a circular base portion configured to slidably move in the channel of the track along the connecting passageway thereof and a stem portion that is at least partially threaded extending from the base portion and the threaded portion may threadingly engage the threaded radially extending aperture in the body portion of the axle member and extend therethrough to regions external the axle member. A nut may be placed on the outer end of the threaded portion to aid in restraining the tension stud in the desired position in the axle member. The base portion clampingly engages the inside surface of the top wall of the track for the restraint in the locked position thereof to prevent relative movement of the restraint and the bracket to which it is attached along the track. The base member is free of clamping engagement with the track so as to be able to move in the channel of the track as the tension stud moves along the connecting passageway for the restraint in the engaged position and the disengaged position. The base portion of the tension stud has a diameter dimension that is less than the diameter dimension of the apertures in the track so that the base portion may be placed into the track as well as removed from the track at any of the apertures thereof for the condition of the base portion aligned with one of the apertures in the track.

A hat shaped bottom washer is mounted on the stem portion of the tension stud and has a washer portion and a tubular portion. The bottom surface of the washer portion of the hat shaped bottom washer is in bearing engagement with a surface of the bracket. A top washer is mounted on the stem portion of the tension stud and the top surface of the top washer is in bearing engagement with the cam surfaces of the handle arms.

A spring member is mounted on the stem portion of the tension stud between the top washer and the bottom washer and, in preferred embodiments of the present invention the spring member is comprised of a pair of oppositely disposed spring washers.

A lift arm is provided and the lift arm has a first end wall and a pair of spaced apart side walls extending from the first end wall to a second end. The first end wall and the spaced apart side walls of the lift arm have a top surface and a bottom surface. A tab portion extends from the top surface of the first end of the lift arm and the tab portion is movable into and out of the tab accepting aperture in the handle portion of the control member and tab extends into the tab accepting aperture for the restraint in the locked position thereof and free of penetration into the tab accepting aperture for the restraint in the engaged position and the disengaged position, thereof. Each of the spaced apart side walls of the lift arm have walls defining aligned back slots extending therethrough and a first preselected direction towards the first end of the lift arm The back slots extend in a first direction and each have a back end and a front end. The outer portions of the axle member extend through the back slots of the lift arm to position the spaced apart side walls of the lift arm adjacent the outer surfaces of the spaced apart handle arms and the lift arm may rotate on the axle member as well as move in limited reciprocating motion for the outer portions of the axle member moving between positions adjacent the back ends of the back slots in the lift arms and the front ends of the back slots in the lift arm.

The bottom surface of the spaced apart side walls of the lift arm also have a guide surface extending upwardly towards the top surface in a second direction different from the first direction from regions adjacent the second end of the lift arm toward the first end of the lift arm and the guide surface. The guide surfaces have a blocking tab in regions adjacent the first end thereof. The guide surface is operatively engageable with the control pins on the outer surfaces of the spaced apart handle arms of the control member so that the control pins slide therealong.

The lift arm has walls defining a pair of aligned lift slots in the spaced apart side walls of the lift arm and the lift slots extend in a direction substantially parallel to the second direction of the guide surface. The lift slots have a first end and a second end.

A plunger member is provided and the plunger member has a plunger head that is sized to fit into the apertures in the track and a plunger stem extending upwardly therefrom. The plunger stem has a radially extending pin accepting aperture therethrough in regions adjacent a top end of the plunger stem. A pin member extends through the lift slots in the lift arms and through the pin accepting aperture in the plunger stem. The pin member has a head on one end thereof adjacent the outer surface of one of the spaced apart side walls of the lift member and a cotter pin accepting aperture on the other end thereof adjacent the outer surface of the other of the side walls of the lift arm. A washer is provided between the cotter pin accepting aperture and the outside surface of the adjacent side wall of the lift arm.

The plunger member moves reciprocatingly towards and away from the track and the plunger head is positioned in one of the apertures of the track to project into the channel of the track for the restraint in the locked position thereof and free of projection into an aperture of the track for the restraint in the engaged position and the disengaged position of the restraint. The plunger stem extends through a wall of the bracket on which the restraint is mounted and a compression spring is mounted on the plunger stem between the plunger head and the wall of the bracket. The compression spring urges the plunger head into the aperture of the track and resists movement of the plunger head from the aperture in the track The plunger is spaced from the tension stud a preselected distance that is different from the spacing of the apertures in the track. In a preferred embodiment of the present invention the spacing of the plunger from the tension stud is one and one half times the spacing of the apertures in the track. Such spacing of the plunger from the tension stud insures that for the condition if the plunder head in the aperture of the track the base portion will be aligned with the inner surface of the top wall of the track between the apertures in the track and can bear against the inner surface of the connecting passageway for the restraint in the locked position thereof.

The restraint is mounted on the track adjacent the cargo load to be restrained with the control member in the upright position thereof, that is, perpendicular to the track and such position defines the disengaged position thereof to allow insertion and removal from the track. The base portion of the tension stud is inserted through one of the apertures in the track. The handle is then moved from the disengaged position to the engaged position wherein the control member is at about a 45 degree angle to the track and the lower surface of the plunger head is in sliding engagement with the outer surface of the top wall of the track. The restraint is moved along the track in either direction and the lower surface of the plunger head slides along the outer surface of the top wall of the track. The plunger head will find the next aperture in the track and, under the influence of the compression spring, the plunger head will drop into the aperture in the track. With the plunger head in the aperture in the track, because of the difference in spacing between the apertures in the track and the distance between the plunger and the tension stud, the base portion of the tension stud is thus aligned with the inner surface of the top wall of the track, between the apertures. The control member may then be moved into the locked position substantially parallel to the track.

For the restraint in the disengaged position thereof, the disengaging cam surface of the handle arms of the control member bears against the upper surface of the top washer mounted on the stem portion of the tension stud and the spring member is released from tension so that the base portion of the tension stud may slide in the channel of the track. In the disengaged position control pins are at the second end of the guide surface and the outer portions of the axle member is at the back end of the back slots in the spaced apart side walls of the lift member. In the disengaged position of the restraint, the headed pin is at the lower end of the lift slots in the side walls of the lift member. The guide surface of the lift member and the lift slots extend in substantially the same angular orientation for example 45 degrees from the plane of the track.

When the control member is rotatingly moved on the axle member into the engaged position, the control pins move along the guide surface towards the front end thereof and the headed pin moves in the lift slots towards the first end of the lift arm and the engaging cam surface of the handle arms bears against the upper surface of the top washer. The lift member moves slightly forward on the outer portion of the axle. The spring member is still not compressed and the base portion of the tension stud is free to move along in the channel in the track. When the plunger head is aligned with an aperture in the track the plunger head moves into the aperture under the force of the compression spring.

The control member is then moved into the locked position of the restraint. In the locked position of the restraint, the locking cam surface bears against the upper surface of the top washer and compresses the spring against the bracket thereby forcing the base portion of the tension stud into clamping engagement with the inner surface of the top wall of the track. The control pins move along the guide surface toward the second end of the lift member to cause the locking cam surface to move into bearing relationship with the top washer thereby compressing the spring and bringing the base portion of the tension stud into the clamping engagement with the track and preventing any further movement of the restraint with respect to the track which also eliminates the rattle often present in prior restraint arrangements.

BRIEF DESCRIPTION OF THE DRAWING

The above and other objects of the present invention my be more fully understood from the following detailed description taken together with the accompanying drawing wherein similar reference characters refer to similar elements throughout and in which:

FIG. 3 illustrates a tension stud useful in the practice of the present invention;

FIGS. 4A and 4B illustrate an axle member useful in the practice of the present invention;

DESCRIPTION OF THE PREFERRED EMBODIMENTS

Figure 1A:
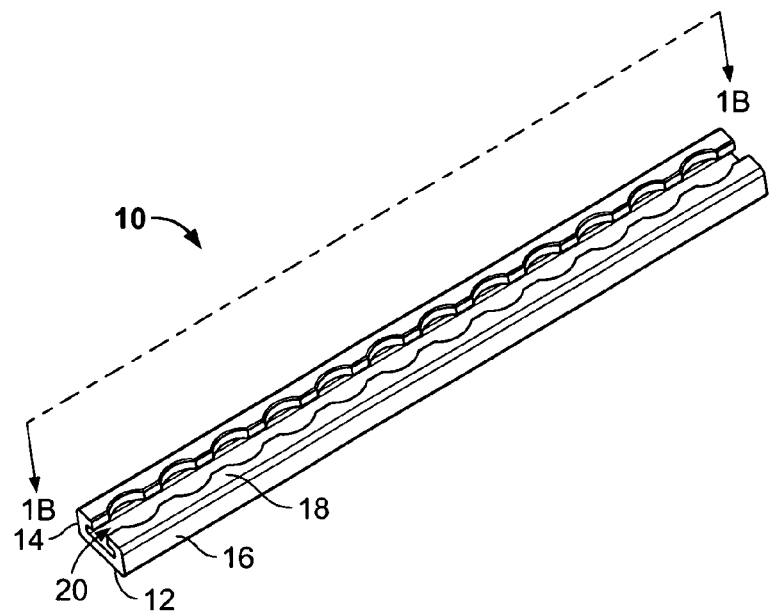
FIGS. 1A, 1B, 1C and 1D illustrate a track useful in the practice of the present invention.
Figure 1B:
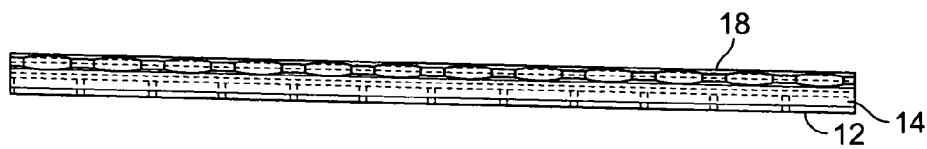
Figure 1C:
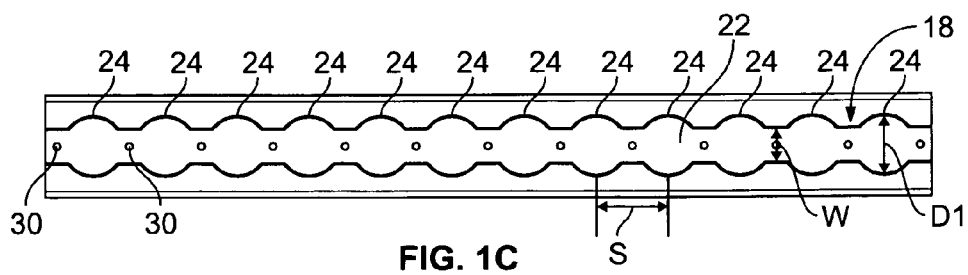
Figure 1D:
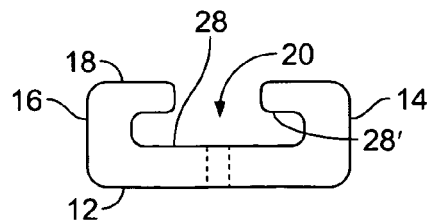

Referring now to the drawing, there is shown thereon a preferred embodiment of the present invention. As noted above, even though the track upon which the restraint of the present invention interacts is not part of the present invention but defines the environment in which the restraint operates to provide the desired objects of the present invention, the configuration of the track is described herein. FIGS. 1A, 1B, 1C and 1D illustrate a generally rectangular tubular track on which the restraint of the present invention may be mounted along with the bracket to which the restraint is coupled. The track, generally designated 10, has a modified, rectangular, tubular box shaped channel configuration.

The box channel track 10 has a bottom wall 12, a pair of opposed side walls 14 and 16 and a top wall 18 defining an interior open channel 20 therebetween. The top wall 18 of the track has a centrally located connecting passageway 22 of a first transverse width W extending along the length of the track 10 and communicating with the channel 20. A plurality of circular apertures 24 in an evenly spaced apart array indicated at S are also provided extending through the top wall 18 of the track 19 along the connecting passageway 22 and the apertures 24 have a second transverse width of the diameter D1 thereof greater than the first transverse width W of the passageway 22. The apertures 24 also communicate with the channel 20. The apertures 24 are circular in plan view. The top wall 18 of the track 10 has an inside surface 28 and the inside surface 28' of the top wall 18 is spaced from the inside surface 28" of the bottom wall 12. The top wall 18 of the track 10 at the connecting passageway 22 between the apertures 24 has a narrower transverse width than the transverse width of the top wall 18 at the apertures 24 so that the inside surface 28' of the top wall 18 at the connecting passageway 22 between the apertures 24 may provide a bearing surface. A plurality of mounting holes 30 may be provided in a spaced array along the bottom wall 12 of the track to allow a connecting member such as a screw (not shown) to be inserted therethrough to secure the track on or in the surface upon which it is mounted. In some installations, the outer surface 18' of the top wall 18 may be flush with the surface upon which the cargo to be restrained rests and in other applications the track 10 may be mounted on the surface upon which the cargo to be restrained is positioned with the bottom surface 12' if the bottom wall 12 resting on the surface.

Figure 2:
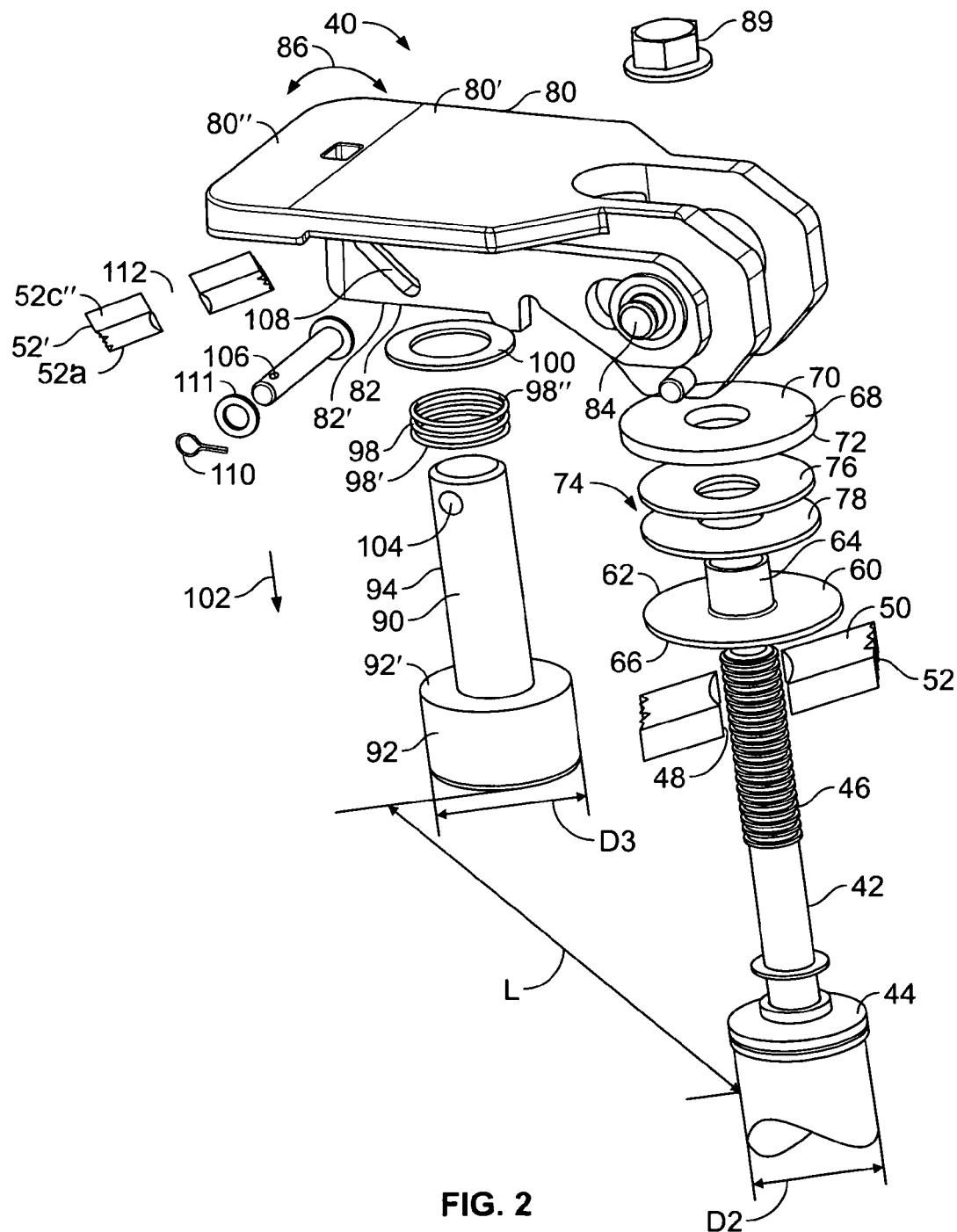
FIG. 2 is exploded view of a restraint according to the principles of the present invention.

Referring now to FIG. 2 there is shown an exploded view of a restraint 40 of a preferred embodiment of the present invention. The track 10 upon which the restraint 40 is mounted is omitted for clarity and only a fragmentary portion of a bracket upon which the restraint is mounted is shown to illustrate the relationship between the restraint 40 and the bracket which must exist in order to utilize the restraint 40.

The restraint 40 has a tension stud 42, which is described below in greater detail in connection with FIGS. 3A and 3B, having a circular base portion 44 and a threaded stem like connecting portion 46 extending from the base portion 44. The base portion 44 is adapted to slidingly move in the channel 20 of the track 10. The base portion 44 has a diameter D2 that is less than the diameter D1 of the apertures 24 in the track 10 but provides a transverse distance that is greater than the transverse distance W of the connecting passageway 22 of the track 10. The base portion 44 of the tension stud 42 fits through the apertures 24 of the track 10 for positioning in the channel 20 of the track 10 during utilization of the restraint 40. As shown on FIG. 2, there is a fragmentary portion of a bracket 52 upon which the restraint 40 is mounted and the bracket 52 has walls defining an aperture 48 through which the threaded connection portion 46 of the tension stub 42 projects. A bottom washer 60 is positioned on the tension stud 42 and the bottom washer 60 may be a hat shaped washer as shown on FIG. 2 and as described below in greater detail in connection with FIG. 8, having a washer portion 62 and a tubular portion 64. The washer portion 62 has a bottom surface 66 which bears against the surface 50 of the bracket 52. In some embodiments of the present invention the hat shaped washer 60 may be replaced by a flat washer without the tubular portion 64.

A top washer 68 is mounted on the tubular portion 64 of the hat shaped washer 60 and has an upper surface 70 and a lower surface 72. A spring member 70 is mounted on the tubular portion 64 of the hat shaped washer 60 and, in preferred embodiments of the present invention the spring member is comprised of a pair of spring washers 76 and 78. In those embodiments of the present invention wherein the hat shaped bottom washer 60 is replaced by a flat washer, the top washer 70 and the spring member 74 are positioned directly on the connection portion of the 46 of the tension stub 42.

A control member 80 and a lift arm 82 are pivotally mounted on an axle member 84 for pivotal motion in the direction of the arrow 86 as the control member 80 and lift arm 82 move from a locked position as shown FIG. 2 through the engaged position as described above and to the disengaged position as described above. The interconnection of the control member 80, the lift arm 82 and the axle 84 is described below in greater detail in connection with FIGS. 6A, 6B, 6C and 6D and the axle member 84 is described below in greater detail in connection with FIGS. 4A and 4B. The axle member 84 has a threaded aperture, as shown on FIGS. 4A and 4B, but not visible on FIG. 2, and the threaded connection portion 46 of the tension stud 42 threadingly engages the threaded aperture in the axle member 84. A nut 89 is provided to threadingly engage the connection portion 46 of the tension stub 42 that projects above the axle member 84 and bears against the axle member 84 to retain the tension stub 42 in place.

A plunger 90 is provided and is spaced a preselected distance indicated at L from the tension stud 42. The distance L is, in preferred embodiments of the present invention, one and one half the spacing S of the apertures 24 in the track 10. The plunger 90 has a plunger head 92 and a plunger stem 94. The plunger head 92 has a dimension D3 that is slightly less than the dimension of the apertures 24 of the track 10 so that the plunger head 92 is adapted to fit into the apertures 24 of the track 10. For the restraint 40 in the locked position shown in FIG. 2, the plunger head 92 is in the channel 20 of the track 10. For the plunger head in the aperture 24 of the track 10 because of the relationship of the dimensions S and L, for the base portion 44 in the channel 20 of the track 10, the base portion 44 is aligned with the inside surface 28' of the connecting passageway 22 of the track 10. The dimension D2 of the base portion 44 of the tension stem 42 is greater than the distance W of the track 10 at the connecting passageway 22.

A compression spring 98 is mounted on the plunger stem 94 and the lower surface 98' of the compression spring 98 bears against the upper surface 92' of the plunger head 92. A washer 100 is placed on the plunger stem 94 and abuts the upper surface 98" of the compression spring 98. The compression spring 98 urges the plunger 94 downwardly in the direction of the arrow 102. The plunger stem 94 has a pin receiving aperture 104 extending radially therethrough. A headed pin 106, described in greater detail below in connection with FIG. 9, extends through lift slots 108 in the lift arm 82 and through the pin receiving aperture in the plunger stem 94. The headed pin 106 is retained by cotter pin 110 extending through a cotter pin receiving aperture 106' (shown in FIG. 9) in the headed pin 106.

In some embodiments of the present invention the headed pin 106 may be replaced by a straight pin that is press fit into pin receiving aperture 104 of the plunger stem 94.

The plunger stem 94 also passes through an aperture 112 in another wall section 52' of the bracket 52 and the wall section 52' is positioned between the washer 100 and the lower surface 82' of the lift arm 82 so that the lower surface 52a' bears against the washer 100 and the upper surface 52a" bears against a lower surface 82' of the lift arm.

Referring now to FIGS. 3A and 3B there is shown thereon the tension stud 42. The base portion 44 may have the configuration shown on FIG. 2 or the configuration shown on FIGS. 3A and 3B, depending upon the particular application. As noted above, the nut 89 threadingly engages the top 46a of the threaded connection portion 46.

Referring now to FIGS. 4A and 4B, there is shown thereon the axle member 84 in a perspective view in FIG. 4A and in a plan view in FIG. 4B. The axle member 84 has a body portion 120 and outer portions 126 and 128. The control member 80 is rotatably mounted on the body portion 120 and the lift arm 82 is rotatable mounted on the outer portions 126 and 128 for rotation thereon. The body portion 120 has a radially extending threaded aperture 122 extending therethrough and the threaded connection portion 46 of the tension stud 42 threadingly engages the threaded aperture 122 for retention therein. The nut 89 (not shown on FIGS. 4A and 4B) bears against the body portion 120 when the nut 89 is tightened on the top 46a of the connection portion 46 of the tension stud 46.

Figure 5A:
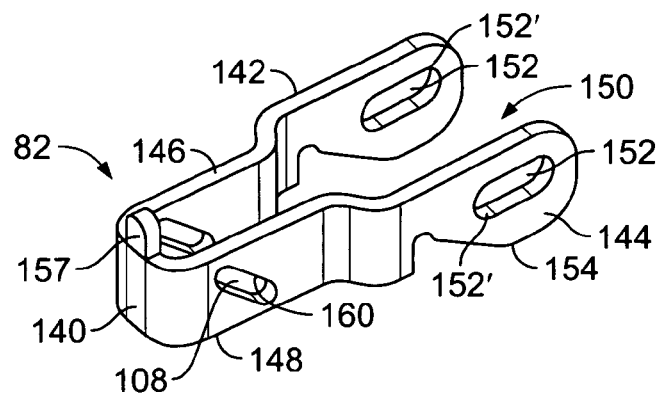
FIGS. 5A, 5B and 5C illustrate a lift arm useful in the practice of the present invention.
Figure 5B:
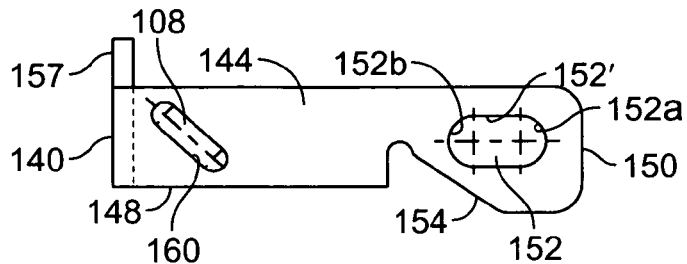
Figure 5C:
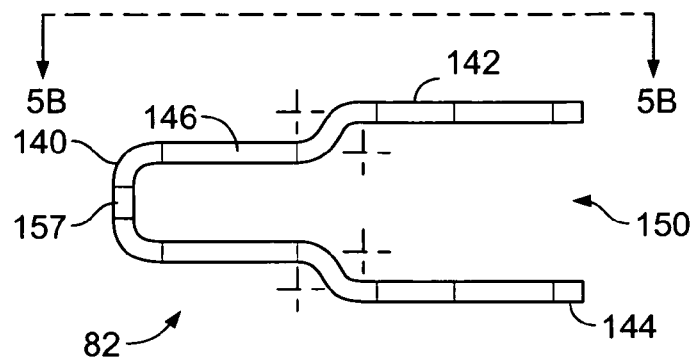

Referring now to FIGS. 5A, 5B and 5C, there is shown thereon the lift arm 82. FIG. 5A is a perspective view of the lift arm 82 and FIG. 5C is a top plan view thereof. FIG. 5B is view along the line 5B-5B of FIG. 5C. The lift arm 82 has first end wall 140 and a pair of spaced apart side walls 142 and 144 extending from the first end wall 140 to a second end indicated at 150. The first end wall 140 and the pair of spaced apart sie walls 142 and 144 have an upper surface 146 and a lower surface 148. A tab portion 152 extends upwardly from the first end wall 140 and extends into a tab receiving aperture 80" of a handle portion 80' of the control member 80 for the restraint in the locked position thereof, as shown more clearly and described below in connection with FIGS. 6A, 6B, 6C, 6D and 6E and free of projecting into the tab receiving aperture 80" for the restraint in the engaged and disengaged positions thereof. Each of the spaced apart side walls 142 and 144 have walls 152' defining aligned back slots 152 and the outer portions 126 and 128 (FIG. 5A and FIG. 5B) of the axle member 84 are positioned in the back slots 152. The lift arm 82, in addition to rotating on the outer portions 126 and 128 of the axle 84 also has a linear motion from a rear portion 152a of the back slots 152 towards a front end 152b of the back slots as the control member 80 is moved from the locked position thereof through the engaged position to the disengaged position. The spaced apart side walls 142 and 146 of the lift arm 82 also have a guide surface 154 and walls 160 defining the aligned lift slots 108 located in regions adjacent the first end 140 of the lift arm 82. The lift slots 108 are angle upwardly at the same angle as the guide surface 154. As noted above the headed pin 106 extends through the lift slots 108 and through the pin receiving aperture in the plunger 90 (FIG. 2) thereby connecting the plunger 90 as part of the restraint 40 and maintaining the distance L between the plunger 90 and the tension stud 42, the first end 140 has an upstanding tab 157 that is adapted to fit into the tab receiving aperture 80" in the control member 80.

Figure 6A:
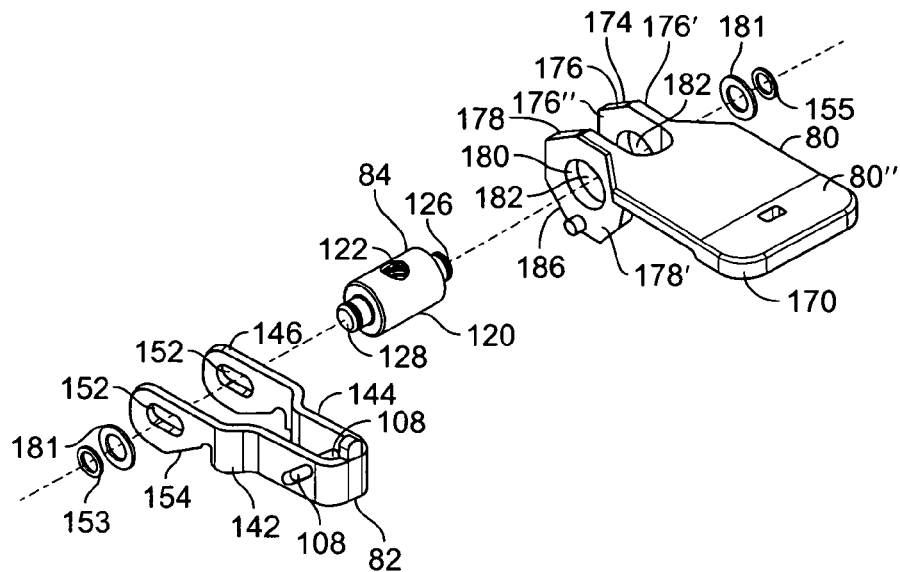
FIGS. 6A, 6B, 6C, 6D and 6E illustrate the assembly of a control member with the axle and the lift arm as utilized in the present invention.
Figure 6B:
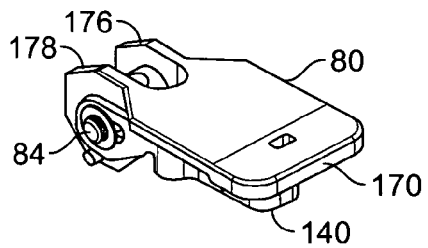
Figure 6C:
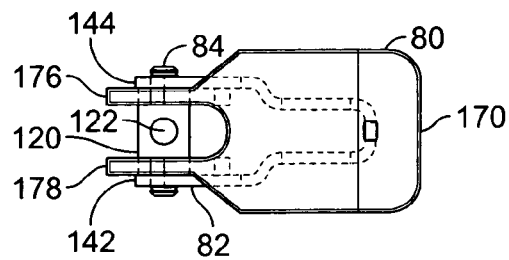
Figure 6D:
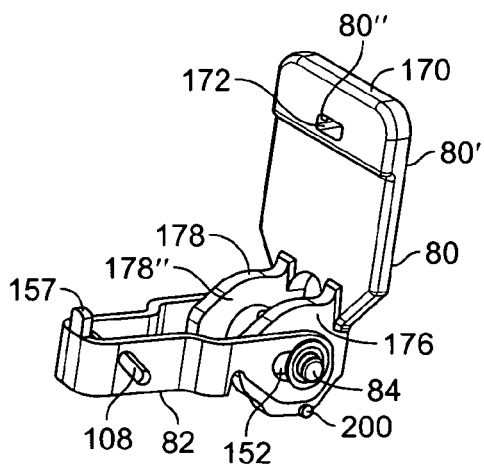

Referring now to FIGS. 6A, 6B, 6C, 6D and 6E there is shown the assembly of the lift arm 82, the axle 84 and the control member 80. FIGS. 6A, 6B, 6C and 6D show the restraint in the locked position thereof and FIG. 6D shows the restraint in the disengaged position thereof. As shown thereon, the control member 80 has a handle portion 80' which may be manually grasped to move the control member 80 between the locked, engaged and disengaged positions thereof. The handle portion 80' has a first end 170 thereof and the first end 170 has walls 172 defining the tab receiving aperture 80" extending therethrough for receiving the tab 157 of the lift arm 82 for the restraint in the locked position thereof. The control member 80 has a forked portion 174 with a pair of space apart substantially identical handle arms 176 and 178. Each of the engagement arms 1776 and 178 have inside surfaces 176' and 178', respectively, and outside surfaces 176" and 178", respectively. Each of the handle arms has walls 180 defining axle receiving aperture 182 extending therethrough and the axle member 84 extends through the axle receiving apertures 182 to allow the rotary motion of the control member 80 thereon.

Figure 6E:
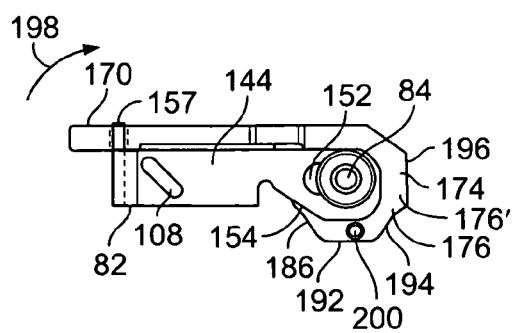

As shown most clearly in FIG. 6E, outer edges 186 of the handle arms 176 and 178 have walls defining three cam surfaces 190, 192 and 194. The cam surface 192 is a locking cam surface and for the restraint 40 in the locked position thereof the cam surface 192 bears down on the top washer 68 (FIG. 2) compressing the springs 76 and 78 thereby forcing the base portion 44 of the of the tension stud 42 into clamping engagement with the inside surface 28' of the track 10 to thereby hold the restraint 40 and the bracket to which it is attached firmly in place as well as eliminating any relative movement of the restrain with respect to track to eliminate any rattling.

As the handle portion 170 is rotated upwardly in the direction of the arrow 198, the engaging cam surface 194 bears on the top washer 68 with less force than exerted by the locked cam surface 192 to release the clamping action of the base 44 in the track 10 and the restraint 40 can move forward an backward on the track 10 until the plunger head 92 is aligned with an aperture 24 of the track 10 and the compression spring 98 pushes the plunger head 92 into the aperture 24 of the track 10 and the handle portion 170 may then be moved into the locked position as shown in FIG. 6E, or into the disengaged position shown in FIG. 6D. As the handle 170 is moved further in the direction of the arrow 198 to the disengaged position shown in FIG. 6D, pins 200 on the outside surfaces 176' and 178' slide along the guide surface 154 which lifts the lift arm 82 for rotation on the outer portions 126 and 28 of the axle member 84. As the lift arm rotates on the outer portion 126 and 128 of the of the axle member 84 the headed pin 108 moves upwardly in the slots 108 thereby raising the plunger 90 so that the plunder head 92 is free of projection into the aperture 24 of the track 10. In the disengaged position of the restraint 40, the restraint may be moved along the track 10 until the base portion 44 of the tension stud is aligned with an aperture 24 of the track 10 and the restraint 40 may lifted out of the track 10. The axle member 84 may be retained in place by, for example, split ring washers 153 and 155 positioned in grooves 171 (FIG. 4B) in the outer portions 126 and 128. Washers 181 may be placed between the split ring washers 153 and 155 and the spaced apart side walls 142 and 144 of the lift arm 82.

Figure 7:
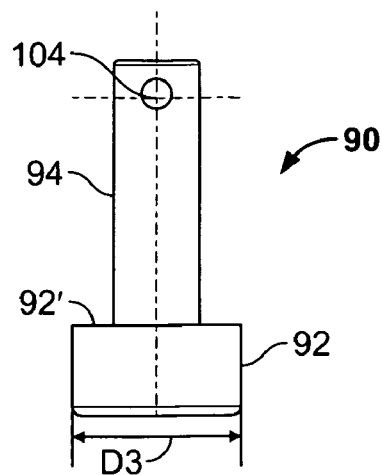
FIG. 7 illustrates a plunger useful in the practice of the present invention.

Referring now to FIG. 7, there is illustrated the plunger 90 as described above in connection with FIG. 2.

Figure 8:
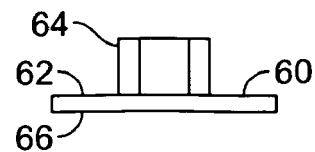
FIG. 8 illustrates a hat shaped washer useful in the practice of the present invention; and, FIG. 9 illustrates a headed pin useful in the practice of the present invention.

Referring now to FIG. 8, there is illustrated the hat shaped bottom washer 60 as described above in connection with FIG. 2. As described above, the hat shaped washer 60 has a washer portion 62 and a tubular portion 64. The bottom surface 66 is substantially planar for engagement with the surface 50 of the wall portion 52 of the bracket. In other preferred embodiments of the present invention, the hat shaped washer 60 may be replaced by a flat washer have the configuration of the washer portion 62 but including the tubular portion 64.

Figure 9:
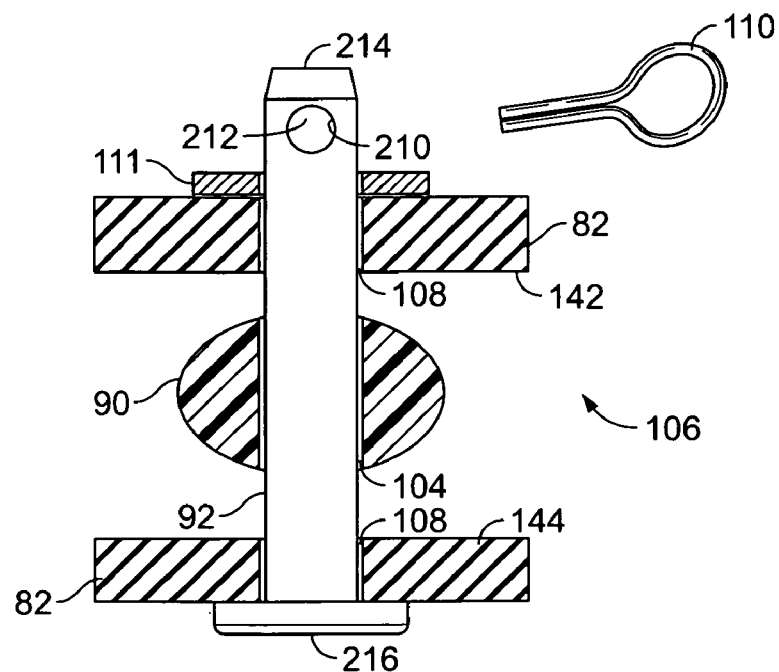

Referring now to FIG. 9 there is illustrated the headed pin 106 as described above in connection with FIG. 2. The headed pin 106 has walls 210 defining a cotter pin aperture 212 extending radially therethrough in regions adjacent the outer end 214. The cotter pin 110 is positioned in the cotter pin receiving aperture 212 and the washer 111 is positioned on the headed pin 106 between the washer 111 and the side wall 142 of the lift arm 82. The head 216 of the headed pin 106 bears against the other side wall 144 of the lift arm 82. The headed pin 106 also extend through the pin receiving aperture 104 of the plunger 90 so that the plunger moves upwardly with the movement of the headed pin 108 moving upwardly in the lift slots 108.

While particular embodiments and applications of the present invention have been above described and illustrated, the present invention is not limited to the precise construction and arrangements disclosed. Those persons knowledgeable in the art may conceive of certain modifications, changes and variations in the detailed embodiments disclosed above as illustrative, to suit particular circumstances or products to be formed. The invention is therefore not intended to be limited to the preferred embodiments depicted, but only by the scope of the appended claims and the reasonably equivalent apparatus and methods to those defined therein

What is claimed is:

1. A cargo restraint of the type mountable on a bracket and the cargo restraint and bracket movable along a track having a preselected design, the restraint comprising, in combination:

a control member pivotally movable between a locked position, an engaged position and a disengaged position, said engaged position for the condition of said control member between said locked position thereof and said disengaged position thereof, and said control member having a handle portion and said handle portion having a first end, and said first end of said handle portion having walls defining a tab accepting aperture extending therethrough, said control member having a forked portion spaced from said first end and said forked portion having a pair of substantially identical spaced apart handle arms and each of said spaced apart handle arms having:

an outer surface and an inner surface;

inner walls defining an axle aperture extending therethrough from said outer surface to said inner surface and said axle apertures in an aligned orientation;

outer edges defining a plurality of three cam surfaces, a first of said cam surfaces defining a locking cam surface, a second of said cam surfaces defining a disengaging cam surface and a third of said cam surfaces defining an engaging cam surface; and, a control pin extending outwardly from said outer surface of each of said handle arms;

an axle member positioned in said axle aperture of said handle arms and said axle member having a body portion intermediate pair of handle walls and outer portions extending to regions external said outer surfaces of said handle walls, and said body portion having walls defining a threaded aperture extending therethrough, and said control member pivotally movable on said axle member between said locked position, said engaged position and said disengaged position;

a tension stud having a base portion and a threaded connection portion extending from the base portion and said threaded portion threadingly engaging said threaded aperture in said axle member, and said base portion of said tension stud in clamping engagement with the track for the condition of said control member in said locked position thereof and said base portion of said tension stud free of clamping engagement with the track for said control member in said engaged position thereof and said disengaged position thereof;

a hat shaped bottom washer having a washer portion and a tube portion mounted on said tension stud, and said washer portion of said bottom washer bearing against the bracket;

a top washer mounted on said tension stud in bearing engagement with said cam surfaces of said handle arms;

a spring member mounted on said tube portion of said bottom washer between said top washer and said washer portion of said bottom washer for resisting movement of said top washer toward said bottom washer;

a lift arm having a first end wall and a pair of spaced apart side walls extending from said first end wall to a second end, and said first end wall and said spaced apart side walls having a top surface and a bottom surface, a tab portion extending from said top surface of said first end wall for projection through said tab accepting aperture of said handle portion of said control member for said control member in said locked position thereof, and said spaced apart side walls having:

walls defining a pair of aligned back slots in regions adjacent said second end and said aligned slots extending in a first preselected direction and a first preselected distance towards said first end, and said back slots having a back end and a front end, and said outer portions of said axle member positioned in said aligned slots for movement therein;

a guide surface adjacent said second end and extending toward said first end from a back end to a forward end in a second preselected direction different from said first preselected direction for sliding engagement with said control pin on said outer surface of said handle arms;

walls defining a pair of lift slots in regions adjacent said first end wall and said lift slots extending substantially parallel to said second preselected direction and having a first end and a second end;

a plunger spaced a first predetermined distance from said tension stud and operatively connected to said lift arm in regions adjacent said first end of said lift arm, and said plunger having a plunger stem and a plunger head, and said plunger moving in reciprocating directions and having a retracted position for said control member in said disengaged position and a projecting position for said control member in said engaged position and said locked position, said plunger stem having walls defining a pin accepting aperture therethrough;

a resilient member mounted on said plunger stem at said plunger head and bearing against the bracket for urging said plunger into said projected position and resisting movement of said plunger into said retracted position a pin member extending through said lift slots in said lift arm and through said pin accepting aperture in plunger stem for moving said plunger in said reciprocating directions for movement of said control member between said locked position and said disengaged position, and said plunger head projecting into an aperture in the track for said control member in said locked position thereof and said engaged position thereof.

2. The arrangement defined in claim 1 wherein:
said outer portions of axle member positioned adjacent said front end of said aligned back slots in said side walls of said lift arm for said control arm in said disengaged position;
said outer portions of axle member positioned adjacent said back end of said aligned back slots in said side walls of said lift arm for said control arm in said locked position;
said locking cam surface of said handle arms compressing said spring member for said control member in said locked position thereof;
said control pin bearing against said back end of said guide surface for said control arm in said engaged position;
said control pin bearing against said guide surface and moving there along from said back end to said front end thereof as said control member is moved from said locked position through said engaged position and into said disengaged position thereof thereby moving said plunger from said projecting position to said retracted position.

3. The arrangement defined in claim 2 wherein:
said second preselected angle of said guide surface and said pin accepting slots is about 45 degrees.

4. The arrangement defined in claim 1 wherein:
said predetermined spacing of said plunger from said tension stud is on the order of one and one half times the spacing of the apertures in the rail.

5. The arrangement defined in claim 1 wherein:
said predetermined spacing of said plunger from said tension stud is on the order of one and one half inches.

6. The arrangement defined in claim 4 wherein:
said plunger stem and said plunger head are circular in cross section.

7. The arrangement defined in claim 1 and further comprising:
retaining rings on said outer portion of said axle member.

8. The arrangement defined in claim 1 wherein:
said spring member comprises at least one spring washer.

9. The arrangement defined in claim 8 wherein:
said spring member comprises two spring washers.

10. The arrangement defined in claim 9 wherein:
said spring washers are in opposed relationship.

11. A cargo restraint of the type mountable on a bracket and the cargo restraint and bracket movable along a track having a preselected design, and wherein the track has a top wall a bottom wall spaced from the top wall and a pair of spaced apart side walls to define a channel therebetween, and a plurality of evenly spaced apart apertures in the top wall extending therethrough in a first predetermined spaced relationship and walls between the apertures defining connecting passageways therebetween, and the top wall having an inside surface and an outside surface, and wherein the bracket is adapted for sliding movement along the outside surface of the track and the bracket having at least one surface for bearing against a cargo to be restrained, the bracket having a body member connected to the at least one surface and the body member having a bottom surface for sliding engagement with the outer surface of the top wall of the track, and a top surface spaced from said bottom surface, and first walls defining a tension stud receiving aperture extending from the bottom surface to the top surface, second walls defining a plunger accepting aperture spaced a second predetermined distance from the tension stud receiving aperture, and the plunger accepting aperture having a plunger stem receiving portion and a plunger head receiving portion, and comprising in combination:
a cargo restraint mounted on the bracket for selective movement therewith along the track, and said cargo restraint having:
a tension stud having a stem positionable in the tension stem receiving aperture of the bracket and a base portion connected to said stem positionable in the channel of the track member and selectively positionable in the channel under the insider surface of the top wall of the track, and selectively positionable in clamping contact with the inside surface of the top wall of the track in a first position and selectively free of clamping contact in a second position;
a plunger having a plunger stem positionable in the plunger stem receiving portion of the plunger receiving aperture of the body member of the bracket and a plunger head selectively positionable in the plunger head receiving portion of the plunger receiving aperture of the body member of the bracket and selectively extendable therefrom between a first position projecting through an aperture of the plurality of apertures in the track and second position free of projection into an aperture in the track, and said plunger movable in reciprocating directions in the plunger receiving aperture of said bracket between the position projecting into an aperture of the track and the second position free of projecting into the aperture of the track;
a control member pivotally movable on the bracket between a locked position, an engaged position and a disengaged position, said engaged position for the condition of said control member between said locked position thereof and said disengaged position thereof for providing said selective movement of said tension stud and said plunger, and said control member having a handle portion and said handle portion having a first end, and said first end of said handle portion having walls defining a tab accepting aperture extending therethrough, said control member having a forked portion spaced from said first end, said forked portion of said control member operatively connected to said tension stud for limited reciprocal movement in the tension stud receiving aperture of the base portion towards and away from the inside surface of the connecting passageway of the top wall of the track, and said base portion of said tension stud sized to allow insertion thereof through an aperture of the plurality of apertures in the top wall of said track and into the channel of the track;
a spring member between the bracket and said control member for urging said base portion of said tension stud into said clamping contact with the inner surface of the top wall of the track at the connecting passageway for said control member in said locked position thereof;
said plunger operatively connected to said control member for selectively controlled reciprocating movement between a locked position for the control member in the locked position wherein said plunger head is in said first position thereof projecting into an aperture of said track member and a disengaged position for the control member in the disengaged position wherein said plunger head is in the second position thereof free of projecting into an aperture of said track member, and said base member of said tension stud is in said clamping contact with the inside surface of the top wall of the track at the connecting passageway thereof for said control member in said locked position thereof.

12. The arrangement defined in claim 11 wherein:
said spring member comprises a pair of spring washers.

13. The arrangement defined in claim 12 and further comprising:
a lift arm operatively connected to said control member and to said plunger for providing said reciprocating motion of said plunger in said plunger receiving cavity of the bracket;
said second predetermined spacing is substantially one and one half said first predetermined spacing.

14. The arrangement defined in claim 13 and further comprising:
a tab on said lift arm in regions adjacent said plunger and said tab positioned in said tab receiving aperture of said handle portion of said control member for said control member in said locked position thereof.

15. The arrangement defined in claim 14 and further comprising:
an axle member mounted on said stem portion of said tension stud in spaced relationship to said base portion of tension stud, and said control member mounted on said axle for said pivotal movement thereof;
a bottom washer mounted on said stem portion of said tension stud and bearing against the top surface of the bracket, a top washer mounted on said stem portion of said tension stud and bearing against said forked portion of said control member and said spring member positioned between said top washer and said bottom washer.

16. The arrangement defined in claim 15 wherein:
said forked portion of said control member has a plurality of cam surfaces for bearing against said top washer comprising a locking cam surface, a disengaged cam surface and an engaged cam surface, and said locked cam surface pressing on said top washer to compress said spring member and said disengaged cam surface bearing against said top washer for substantially relieving said compression of said spring member.

17. The arrangement defined in claim 16 wherein:
said lift arm mounted for limited pivotal movement on said axle between said locked position and said disengaged position.

18. The arrangement defined in claim 17 and further comprising:
a resilient member mounted on the plunger stem of said plunger in the plunger receiving cavity of the body member between the body member and said plunger head for urging said plunger head into an aperture in the track.

* * * * *